United States Patent [19]
Doi

[11] Patent Number: 5,145,024
[45] Date of Patent: Sep. 8, 1992

[54] ENGINE SUSPENSION SYSTEM

[75] Inventor: Kazuhiro Doi, Fujisawa, Japan

[73] Assignee: Nissan Motor Co., Ltd., Yokohama, Japan

[21] Appl. No.: 717,197

[22] Filed: Jun. 18, 1991

[30] Foreign Application Priority Data

Jun. 18, 1990 [JP] Japan ................................. 2-159372

[51] Int. Cl.⁵ ............................................ B62D 21/00
[52] U.S. Cl. .................. 180/312; 188/267; 267/140.1 AE; 267/140.1 C
[58] Field of Search ........................ 180/312; 188/267; 267/140.1 AE, 140.1 C, 140.1 E

[56] References Cited

U.S. PATENT DOCUMENTS

| 3,599,428 | 8/1971 | Chaney et al. ........................ 60/326 |
| 4,671,227 | 6/1987 | Hollerweger et al. ........... 123/192.1 |
| 4,720,087 | 1/1988 | Duclos et al. .............. 267/140.1 AE |
| 4,733,758 | 3/1988 | Duclos et al. .............. 267/140.1 AE |
| 4,742,998 | 5/1988 | Schubert .............................. 267/136 |
| 4,757,981 | 7/1988 | Haertel ..................... 267/140.1 AE |
| 4,759,534 | 7/1988 | Haertel ..................... 267/140.1 AE |
| 4,773,632 | 9/1988 | Haertel ......................... 267/240.1 E |
| 4,909,489 | 3/1990 | Doi .............................. 267/140.1 C |
| 4,928,935 | 5/1990 | Matsui ......................... 267/140.1 A |
| 4,971,299 | 11/1990 | Doi .............................. 267/140.1 C |

FOREIGN PATENT DOCUMENTS 60-104828 6/1985 Japan .
61-74930 4/1986 Japan .

Primary Examiner—Kenneth R. Rice
Attorney, Agent, or Firm—Foley & Lardner

[57] ABSTRACT

In order to improve vibration attenuation (during engine shake and idling for example), reduce power consumption and increase the longevity of elements associated with the application of a high voltage to electrodes which control the viscosity of an ERF in an orifice passage, the rate at which the ERF is flowing in the passage is estimated based on a relative displacement parameter or the like, and used to modify the actually applied voltage level.

5 Claims, 5 Drawing Sheets

- MAX APPLIED VOLT
○ MIN APPLIED VOLT

ENGINE SUSPENSION SYSTEM

BACKGROUND OF THE INVENTION

1. Field of the Invention

The present invention relates generally to an engine mounting arrangement which employs one or more ERF (electrorheological fluid) filled bushes and more specifically to such an arrangement which features improved control of the voltage which is applied to the electrodes via which the viscosity of the ERF is controlled.

2. Description of the Prior Art

JP-A-60-194828 discloses an engine mount of the arrangement wherein the mounts which are disposed between the engine and the chassis include, in addition to the elastomeric members which provide resilient support, two chambers which are fluidly communicated via an orifice passage or passages. The chambers are filled with an ERF and electrodes are disposed in the orifice passage(s) in a manner which enables a voltage to be impressed across the fluid which is passing through the orifice passage and thus induce a notable change in the viscosity of the same.

In this arrangement the voltage application is controlled in accordance with a parameter such as the engine rotational speed, and in a manner which is intended to enable the selective control of the dynamic spring constant and loss factor of the mount in a number of different vibration frequency ranges.

However, as shown in FIG. 7 the relationship between the applied voltage and the peak floor vibration level is such that the no consideration has been given to the effect of the rate at which the variable viscosity ERF which flows through the orifice passage(s) and the applied voltage has been set at a fixed level.

The optimal voltage which produces the maximum attenuation for the peak floor vibration level is shown in FIG. 7 by the large black dots. By way of example, when engine shake occurs and the maximum voltage is applied to the electrodes, while the flow rate is high there is no problem, however as shown, when the flow rate is low, the attenuation of the peak floor vibration level attenuation is deteriorated. In addition, the application of the high voltage consumes a relatively large amount of energy and reduces the longevity of a number of components which make up the device.

SUMMARY OF THE INVENTION

It is an object of the present invention to improve vibration attenuation (during engine shake and idling for example), reduce power consumption and increase the longevity of elements associated with the application of a high voltage to electrodes which control the viscosity of an ERF in an orifice passage.

In brief, the above object is achieved by an arrangement wherein the rate at which the ERF is flowing in the passage is estimated based on a relative displacement parameter or the like, and used to modify the level of the voltage actually applied to the viscosity control electrodes.

More specifically, a first aspect of the present invention comes in an engine suspension system for supporting an engine on a chassis and which features: a mount having chambers between which an ERF can be pumped through an orifice passage in response to relative displacement between the engine and the chassis; electrodes disposed in the orifice passage; means for selectively applying a voltage to said electrodes; and means for estimating the rate at which the ERF is flowing through said orifice passage and for varying the level of the voltage which is applied to said electrodes.

A second aspect of the present invention comes in a mounting device having first and second chamber fluidly interconnected by an orifice passage, and electrodes disposed in the orifice passage for impressing a voltage on an ERF which fills the first and second chambers and the orifice passage, the mounting device featuring: means for estimating the rate which the ERF is flowing in the orifice passage; and means for selectively varying the voltage which is applied to the electrodes based on the estimated flow rate.

Another aspect of the present invention comes in a method of controlling a mount which supports an engine on a chassis, the method featuring the steps of: determining the vibration frequency; selectively applying a voltage to electrodes which are disposed in an orifice passage interconnecting first and second fluid chambers filled with an ERF, in accordance with the determined frequency; estimating the rate at which the ERF is flowing through the orifice passage; and modifying the level of the voltage which is selectively applied to the electrodes.

A further aspect of the invention comes in an arrangement for supporting an engine on a chassis, the arrangement featuring: means for determining the vibration frequency; means for selectively applying a voltage to electrodes which are disposed in an orifice passage interconnecting first and second fluid chambers filled with an ERF, in accordance with the determined frequency; means for estimating the rate at which the ERF is flowing through the orifice passage; and means for modifying the level of the voltage which is selectively applied to the electrodes.

DETAILED DESCRIPTION OF THE PREFERRED EMBODIMENTS

Figure 1:
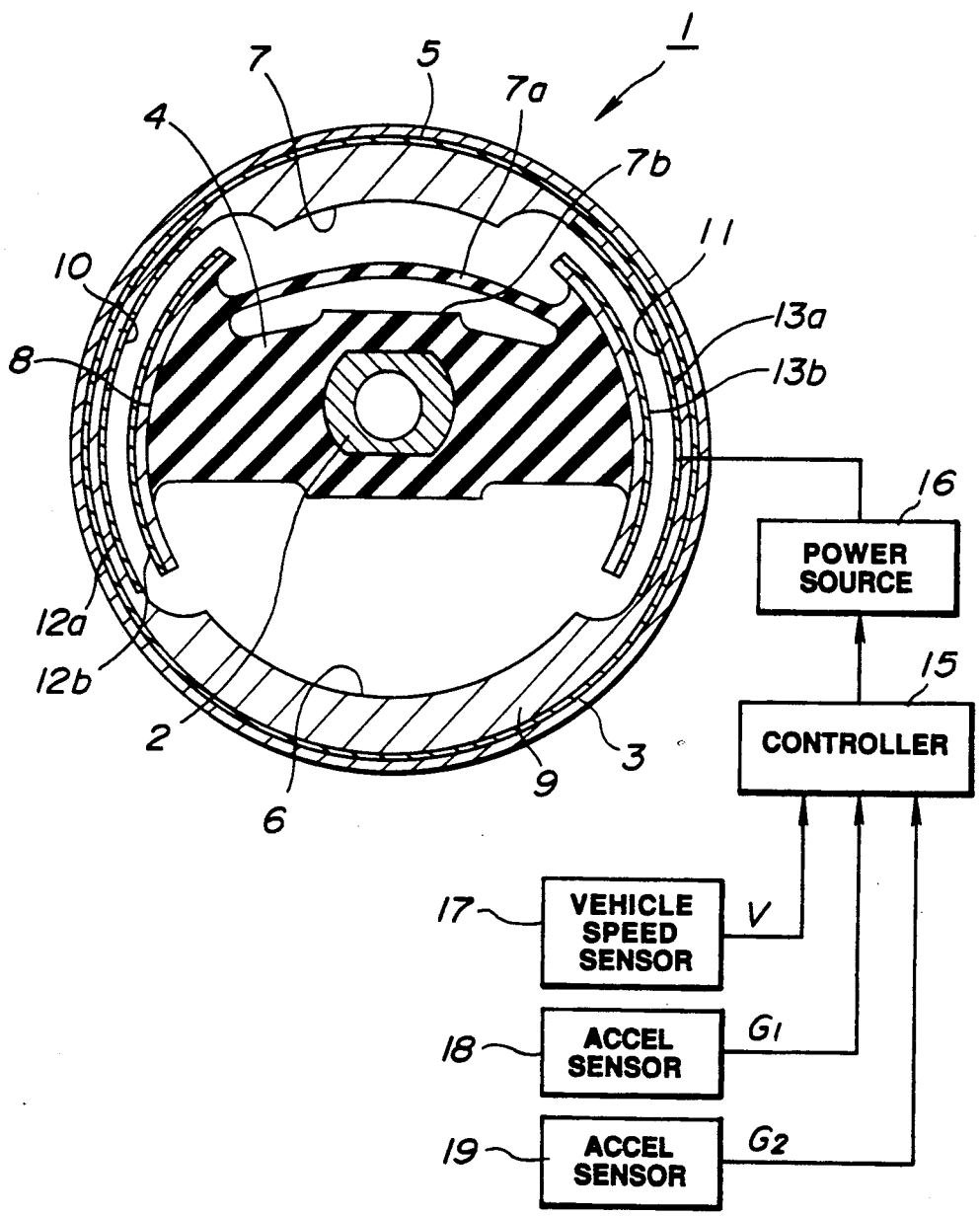
FIG. 1 is a sectional elevation showing an embodiment of the present invention.

FIG. 1 shows an embodiment of the present invention. In this arrangement, an engine mount 1 is operatively connected between a non-illustrated engine and chassis, and basically comprises an inner member 2, an outer cylindrical member 3 and an elastomeric body which is fixedly secured thereto. A relatively thin tubular layer of elastomer or membrane 5 is disposed between the outer periphery of the elastomeric body 4 and the inner periphery of the outer member 3.

The elastomeric member 4 is suitably aperture in a manner to define a main working chamber 6, an auxiliary or expansion chamber 7 and an air space 7b which is hermetically separated from the auxiliary chamber 7 by a flexible diaphragm 7a. The elastomeric body 4 is further formed with arcuate channels 8 which define orifice passages 10 and 11 and via which ERF can be pumped back and forth between the main and auxiliary chambers 6 and 7.

The main chamber 6, auxiliary chamber 7 and the orifice passages 10, 11 are filled with an ERF which exhibits predetermined changes in viscosity when exposed to a predetermined voltage.

Electrodes 12a, 12b and 13a and 13b are disposed in the orifice passages in the illustrated manner and electrically connected with a source of power 16. This source of power is controlled by a controller 15 which is arranged to receive data inputs from a vehicle speed sensor 17 and first and second G sensors 18 and 19. In this instance the first of the G sensors is mounted on the engine proximate the mounting location and arranged to output a signal $G_1$ indicative of the acceleration which is occurring at that point. The second G sensor is mounted on the vehicle chassis at a location proximate the engine mount and arranged to output a signal $G_2$.

Depending on the data inputs, the controller 15 which contains a microprocessor, derives the appropriate timing and voltage which is to be applied to the electrodes 12a, 12b and 13a, 13b and outputs a suitable control signal to the power source 16.

In connection with the control which characterizes the instant embodiment, it will be noted that in the case of a four cylinder four cycle reciprocating type internal combustion engine the main vibration to which the engine is subject is the secondary harmonic, while in the case of a six cylinder engine the third harmonic is the predominant vibration which is generated.

Figure 2:
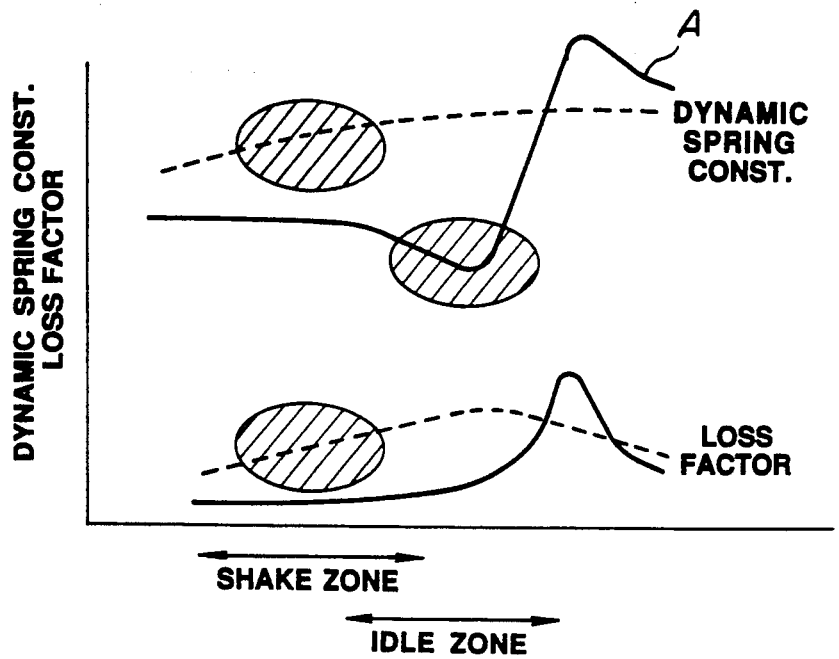
FIG. 2 is a graphs which shows, in terms of dynamic spring constant/loss factor and frequency, the characteristics which are provided at low and high viscosities.

Accordingly, as shown in FIG. 2, the mass of the slugs of ERF contained in the orifice passages 10, 11, the expansion direction spring constant of the elastomeric body and the resulting resonance frequency, of arrangement are selected so as to fall in a range close to that of the appropriate harmonic when the engine is idling and so that a low dynamic spring constant is achieved (see FIG. 2).

When a voltage is impressed on the orifice passage electrodes, the dynamic spring constant, which is determined by the vertical direction spring constant Ks and the expansive spring constant Ko, is such that the expansive spring constant Ko has the effect of adding to the overall dynamic spring constant of the engine mount. By increasing the viscosity of the ERF in the orifice passages it is possible to increase this effect. On the other hand, the loss factor is effected by the shape and dimensions of the orifice passages along with the viscosity. Accordingly, by controlling the voltage which is applied to the electrodes 12a, 12b and 13a and 13b, it is possible to control both the dynamic spring constant and the loss factor.

By increasing the viscosity of the ERF to a high level it is possible to condition the engine mount to exhibit a dynamic spring constant and a loss factor characteristics of the nature indicated by the broken line traces in FIG. 2. On the other hand, when the viscosity is low the solid line trace characteristics are obtained. Accordingly, when vibration falls in the engine shake range, a voltage is impressed thus achieving a relatively high dynamic spring constant and loss factor, while when the vibration falls in the idle range the electrodes are left de-energized thus achieving lower dynamic spring constant and loss factor values.

However, the viscosity of the ERF in the orifice passages is such that when the flow rate is high it is impossible to increase the viscosity to a high level and the characteristics deviate from those which are depicted by the broken line traces.

Figure 3:
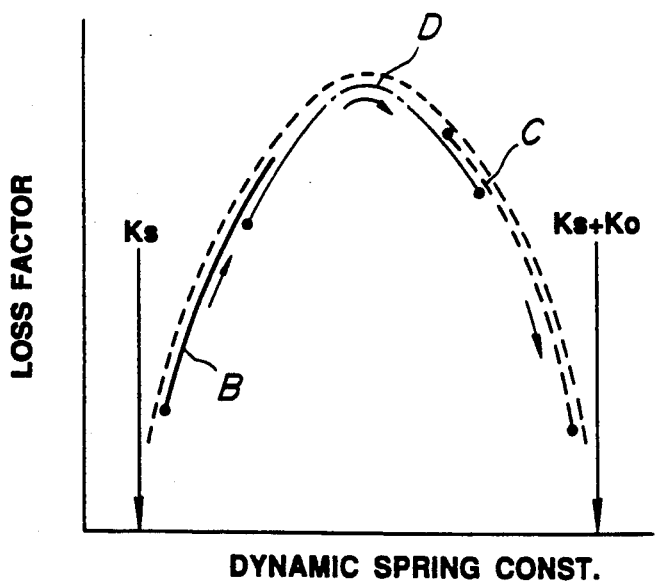
FIG. 3 is a graph which shows in terms of dynamic spring constant and loss factor, the relationship with exists between the dynamic spring constant, loss factor, fluid flow rate and applied voltage.

That is to say, when the flow rate is high and it is impossible to raise the viscosity to a high level, the effect on the expansive spring constant Ko is small as indicated by B in FIG. 3 and the overall effect on the dynamic spring constant of the engine mount is correspondingly small. On the other hand, when the flow rate is low the viscosity increases markedly, the effect on the dynamic spring constant is large as indicated by C, and thus there is a large influence on the dynamic spring constant of the mount. In the case wherein the flow rate exhibits a value intermediate of the high and low ones the effect indicated by D in FIG. 3 is produced.

Further, as shown in FIG. 3, while the loss factor of the mount is such as to exhibit an increase when the flow rate exhibits a high value and a voltage is impressed on the orifice passage electrodes, in the case wherein the flow rate is low, the increase in viscosity which occurs is such as reduce the loss factor and induce a corresponding reduction in the damping effect.

Figure 4:
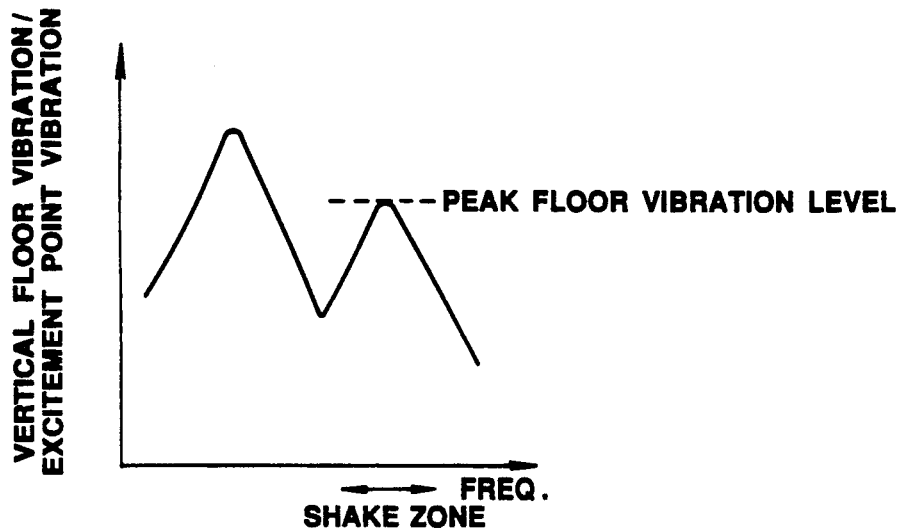
FIG. 4 is a graph which shows peak floor vibration level characteristics in terms of frequency and a ratio of vertical floor vibration to excitement point vibration.
Figure 5:
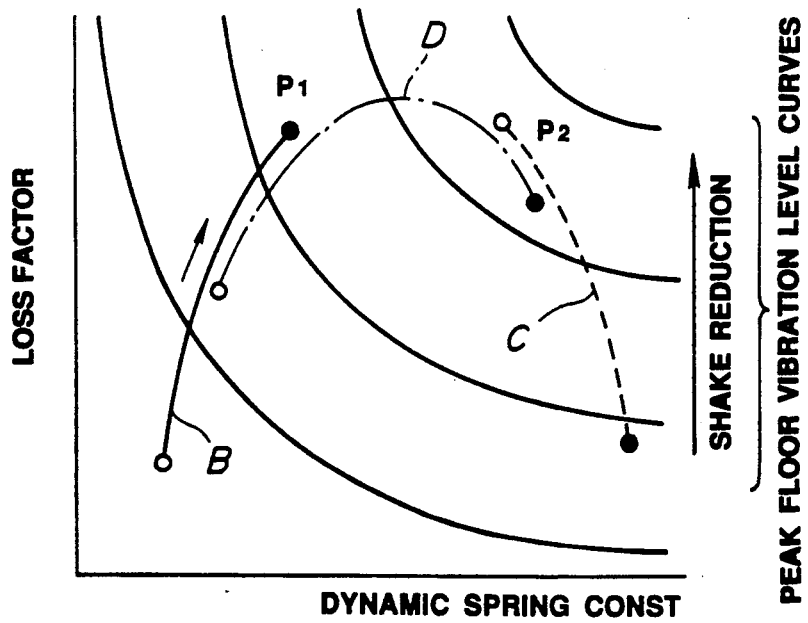
FIG. 5 graphically shows in terms of dynamic spring constant and loss factor, the effect of relative displacement between the engine and the chassis.

The maximum peak floor vibration level value in the engine shake range (=10 Hz) as shown in FIG. 4 in terms of the ratio of the vertical floor vibration to the excitement point vibration, is shown in FIG. 5 in terms of dynamic spring constant and loss factor in the same manner as depicted in FIG. 3.

By preparing mapped data of the nature shown in FIG: 5, it is possible in the engine shake zone to determine the applied voltage to level which will enable the maximum possible shake attenuation.

It should be noted that mapped data of the nature shown in FIG. 5 varies with each type of engine/chassis system and thus must be individually developed.

Figure 6:
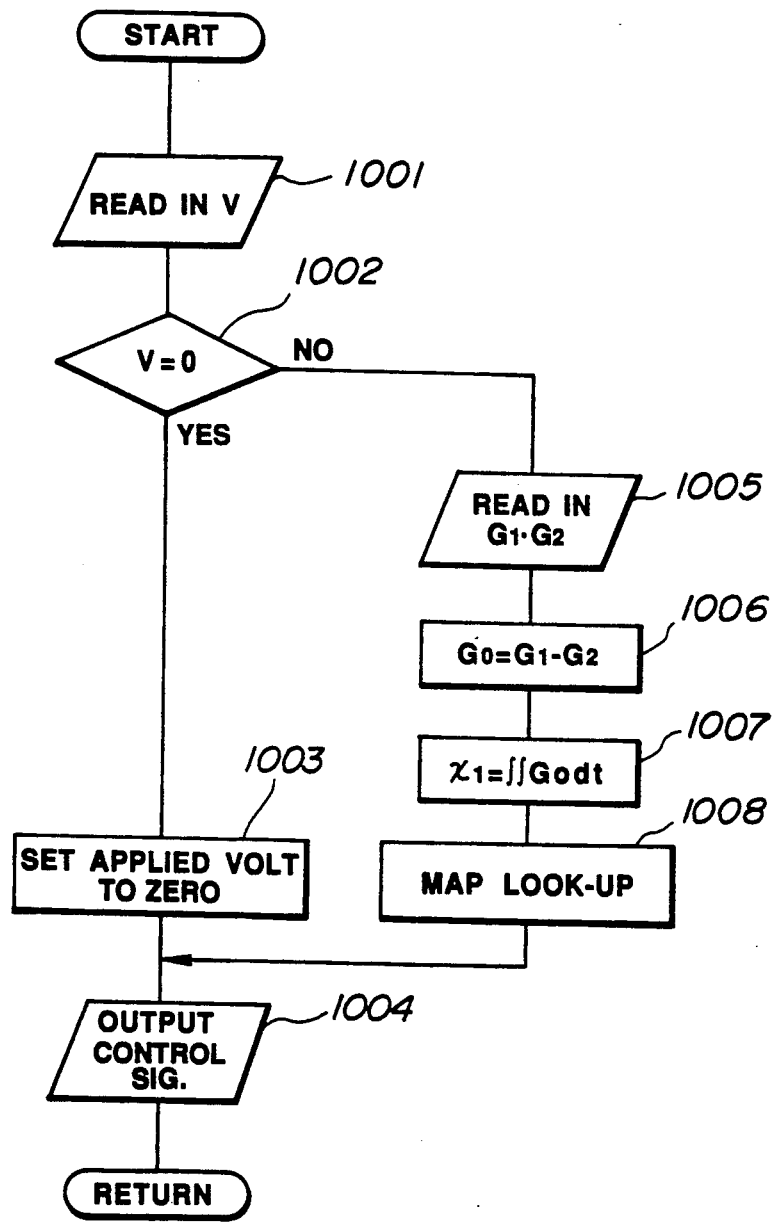
FIG. 6 is a flow chart which depicts the steps which characterize the voltage control according to the present invention.
Figure 7:
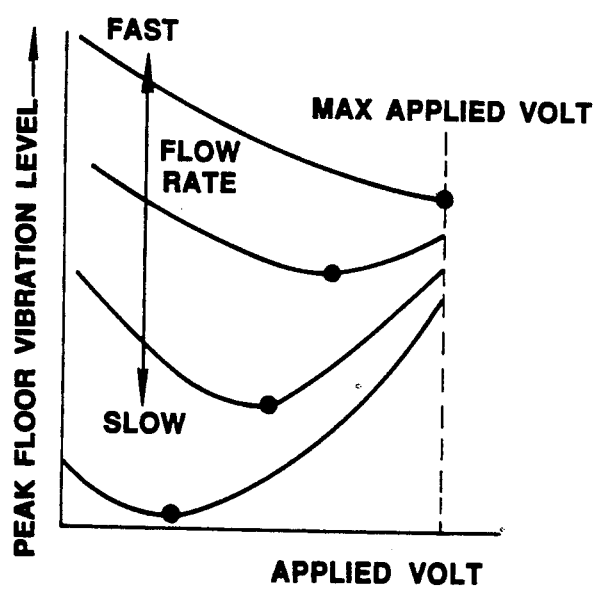
FIG. 7 is a graph which shows in terms of applied voltage and peak floor vibration level, the relationship which exists between the peak floor vibration level and fluid flow rate.

FIG. 6 shows in flow chart form a voltage control routine which is run in the microprocessor included in the controller 15. The first two steps of this routine are such as to read in the vehicle speed and to determine if the vehicle is moving or not. As will be noted, in the event that it is found the vehicle speed is zero the routine goes directly to step 1003 wherein a command to set the applied voltage to zero is issued. Following this the appropriate signal is issued in step 1004.

On the other hand, if the vehicle is moving, then the routine is directed to step 1005 wherein the inputs from the two accelerometers or G sensors 18 and 19 are read in. Following this in step 1006, the difference Go of the two values is derived ($G_o = G_1 - G_1 - G_2$) and in step 1007 subject to two sequential integrations in a manner which derives the relative displacement x1 which occurs between the engine and the chassis on which it is supported. It will be noted that it is difficult to actually determine the rate at which the ERF is flowing through the orifice passages based on this data and that it is necessary to develop a suitable relation between the two parameters.

The routine then proceeds to step 1008 wherein a map look-up using mapped displacement/voltage data which is organized in accordance with the curves depicted FIG. 5, is carried out to determine the voltage which will maximize the engine shake attenuation.

When the relative displacement x1 is large (e.g. exhibits an amplitude in the order of ±2.0 mm) the characteristics denoted by the solid line trace B in FIG. 5, are produced and a voltage control range having a maximum value of P1 is set for use. On the other hand, if the relative displacement between the engine and chassis is relative small (exhibits an amplitude in the order of ±0.1 mm) the characteristics denoted by C are produced and the shake attenuation voltage is set in a range wherein the minimum values is P2 (a value slightly larger than P1). At intermediate displacement values the characteristics such as indicated by the phantom trace D can be employed.

The invention is not limited to the above type of mapping arrangement and various other techniques and/or data arrangements which enable displacement or the like type of parameter (e.g. pressure variation in the main working chamber 6) to be used to approximate the flow rate which currently occuring the in the orifice passages, are deemed to fall within the purview of the invention.

With the above type of control, as the maximum possible voltage to the orifice passage electrodes 12a, 12b & 13a and 13b is not always applied, it is possible to avoid wasting electrical power and to improve the longevity of the parts which are subject to the high voltages.

It will be noted that the present invention is not limited to the use of two G sensors to determined the flow rate of the ERF in the orifice passage, and that as an alternative, it is possible to dispose a pressure sensor in the main working chamber 6 or determined the degree to which the elastomeric body 4 is distorted. Further, in order to determined the level of voltage which is to be applied, it is within the scope of the present invention to utilize engine speed as a control parameter.

What is claimed is

1. In an engine suspension system for supporting an engine on a chassis
    a mount having chambers between which an ERF can be pumped through an orifice passage in response to relative displacement between the engine and the chassis;
    electrodes disposed in the orifice passage;
    means for selectively applying a voltage to said electrodes; and
    means for estimating the rate at which the ERF is flowing through said orifice passage and for varying the level of the voltage which is applied to said electrodes.

2. An engine suspension system as claimed in claim 1 wherein said estimating means comprises:
    first and second accelerometer, the first accelerometer being disposed on the engine, the second accelerometer being disposed on the chassis; and
    means responsive to the outputs of the first and second accelerometers for determining the relative displacement between the engine and the chassis.

3. In a mounting device having first and second chamber fluidly interconnected by an orifice passage, and electrodes disposed in the orifice passage for impressing a voltage on an ERF which fills the first and second chambers and the orifice passage;
    means for estimating the rate at which the ERF is flowing in the orifice passage; and
    means for selectively varying the voltage which is applied to the electrodes based on the estimated flow rate.

4. A method of controlling a mount which supports an engine on a chassis comprising the steps of:
    determining the vibration frequency;
    selectively applying a voltage electrodes which are disposed in an orifice passage interconnecting first and second fluid chambers filled with an ERF, in accordance with the determined frequency;
    estimating the rate at which the ERF is flowing through the orifice passage; and
    modifying the level of the voltage which is selectively applied to the electrodes.

5. An arrangement for supporting an engine on a chassis comprising:
    means for determining the vibration frequency;
    means for selectively applying a voltage to electrodes which are disposed in an orifice passage interconnecting first and second fluid chambers filled with an ERF, in accordance with the determined frequency;
    means for estimating the rate at which the ERF is flowing through the orifice passage; and
    means for modifying the level of the voltage which is selectively applied to the electrodes.

* * * * *